United States Patent [19]

Stewart

[11] Patent Number: 4,679,434
[45] Date of Patent: Jul. 14, 1987

[54] INTEGRATED FORCE BALANCED ACCELEROMETER

[75] Inventor: Robert E. Stewart, Woodland Hills, Calif.

[73] Assignee: Litton Systems, Inc., Woodland Hills, Calif.

[21] Appl. No.: 758,692

[22] Filed: Jul. 25, 1985

[51] Int. Cl.[4] .............................................. G01P 15/02
[52] U.S. Cl. .................................. 73/517 B; 73/514; 73/517 R; 403/291
[58] Field of Search ................. 73/514, 516 R, 517 R, 73/517 B; 308/2 A

[56] References Cited

U.S. PATENT DOCUMENTS

| | | | |
|---|---|---|---|
| 2,793,028 | 5/1957 | Wheeler | 308/2 A |
| 2,947,067 | 8/1960 | Vice et al. | 308/2 A |
| 3,226,981 | 1/1966 | Mullins et al. | 73/517 R |
| 3,713,088 | 1/1973 | Lehner et al. | 73/517 R |
| 3,897,997 | 8/1975 | Kalt | 350/486 |
| 3,978,715 | 9/1976 | Farstad | 73/516 R |
| 4,009,607 | 3/1977 | Ficken | 73/517 B |
| 4,188,829 | 2/1980 | Brown | 73/517 R |
| 4,345,474 | 8/1982 | Deval | 73/517 B |
| 4,483,194 | 11/1984 | Rudolf | 73/517 B |
| 4,533,100 | 8/1985 | Paseri | 308/2 A |

OTHER PUBLICATIONS

Petersen et al., "Micromechanical Accelerometer Integrated with MOS Detection Circuitry", in *Proc. Int. Electron Devices Meeting* (Dec. 1980), pp. 673-675.

*Primary Examiner*—Stewart J. Levy
*Assistant Examiner*—John E. Chapman, Jr.
*Attorney, Agent, or Firm*—Poms, Smith, Lande & Rose

[57] ABSTRACT

An accelerometer fabricated from a semiconductor substrate sandwiched between two non-conductive plates is shown having an inertial mass formed by etching the substrate. The mass is joined to the substrate by hinges having crossed blades to provide flexure in one direction and rigidity in other directions. The fabrication technique permits the integration of accelerometer servo and signal processing circuitry upon the same substrate in which the accelerometer mass is formed.

13 Claims, 6 Drawing Figures

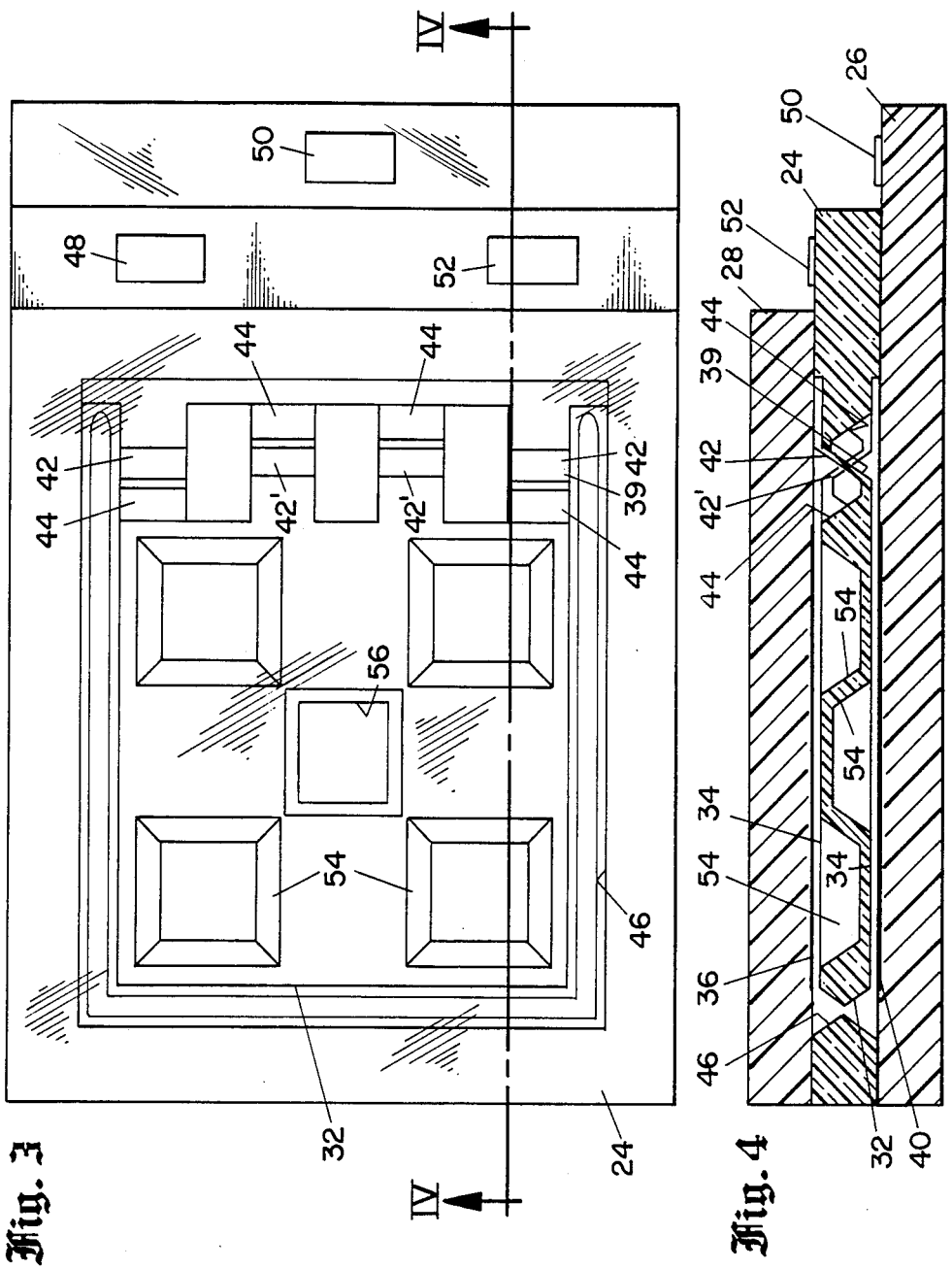

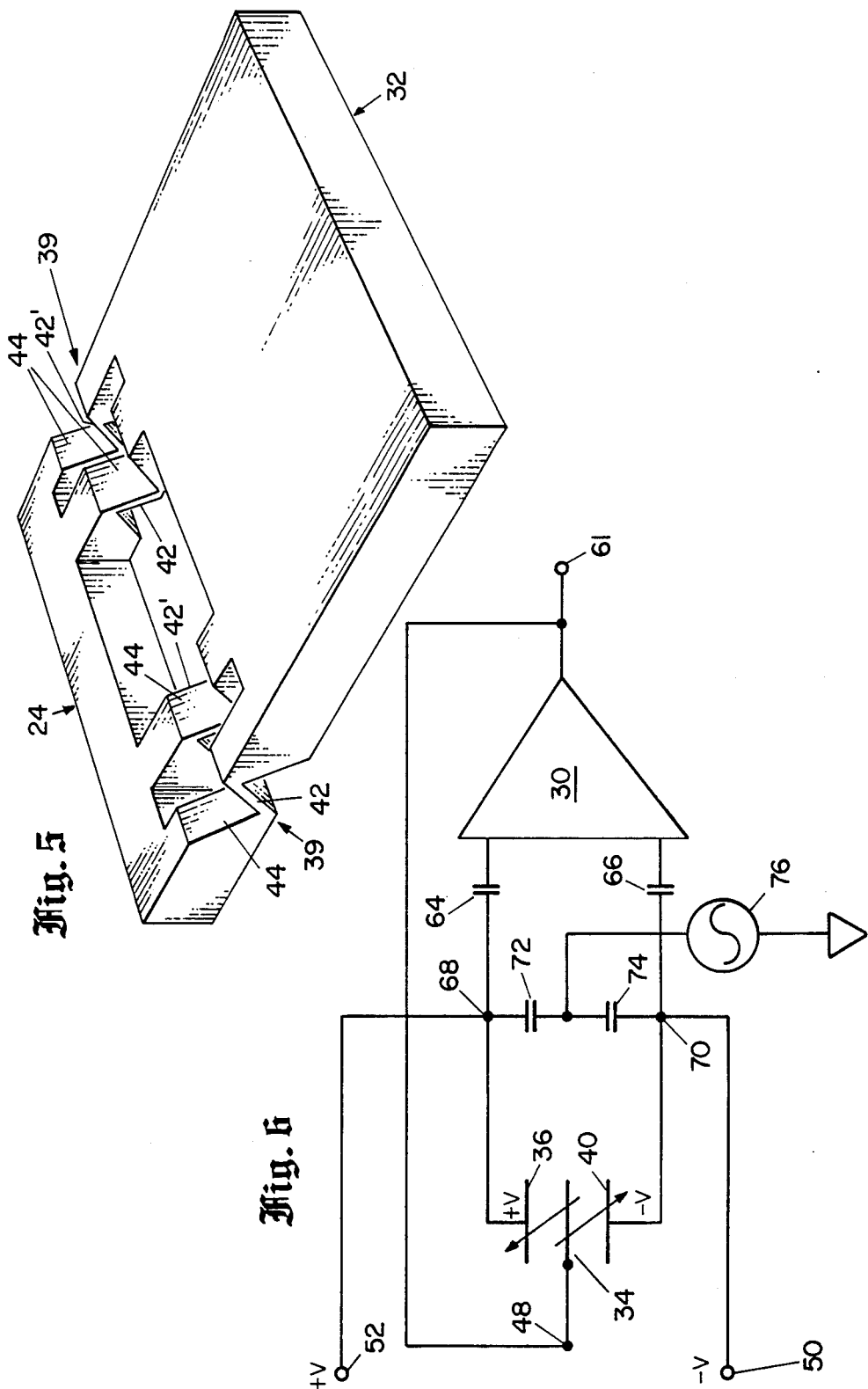

INTEGRATED FORCE BALANCED ACCELEROMETER

BACKGROUND

1. Field Of The Invention

The present invention relates to an integrated and force balanced accelerometer of the closed loop type. More particularly, this invention pertains to an integrated accelerometer formed within a semiconductor substrate that includes associated servo and signal processing electronics formed within a common substrate.

2. Description Of The Prior Art

The integration of sensors and associated signal processing circuitry on a single silicon chip began with pressure transducers about ten years ago. Intensive efforts are currently underway at several universities and industrial research laboratories to extend this technology to many applications including accelerometers.

To date, accelerometers of the open loop type have been built and tested. Typical of such open loop designs are those that include a cantilevered beam constructed from a semiconductor substrate that has an inertial mass attached to its free end. Disposed on opposite sides of such a cantilevered structure are piezoresistive sensing elements. The electrical resistance of such sensing elements vary as the mass moves in response to acceleration forces, stressing the cantilevered beam. Such open loop accelerometers are hampered by poor null stability, high hysteresis and excessive temperature sensitivity.

SUMMARY OF THE INVENTION

The present invention extends the technology of the open loop accelerometer design to the more accurate closed loop accelerometer design required in inertial guidance and flight control systems applications. The present invention describes a closed loop, force balanced accelerometer produced by batch processing of silicon wafers in much the same way an integrated circuit is produced.

The accelerometer of the present invention includes a critical central inertial mass constructed from a semiconductor substrate, such as silicon, which may be doped to produce conductive members where needed. The inertial mass is attached to the substrate by hinges all of which are formed by the anisotropic etching of the single crystal silicon. The hinges connect the inertial mass to the substrate in a cantilevered arrangement.

The cantilevered connection of the mass is preferably accomplished by hinges formed from crossed beam flexure blades. The blades are formed by a V-shaped groove etched in opposite surfaces of the semiconductor substrate, leaving a thin, angled blade of silicon that joins the inertial mass to the substrate. A second crossed beam flexure blade is formed by similar grooves offset from the first set of grooves by approximately one-half a groove width. The second set of grooves is reversed. The resulting inclined, thin flexure blade is thus oriented at an opposite inclination to its counterpart. Because of the offset and reversal, the two flexured blades cross at their midsections to provide high rotational compliance about an axis parallel to the plane of the silicon substrate while providing high stiffness for rotation or translation in other directions.

A closed loop accelerometer amenable to fabrication by well-known semiconductor fabricating technologies including, for example, photolithographic and differential etching, offers many advantages including tight tolerance control and the ability to integrate all or part of the accelerometer electronics into a single common substrate of relatively minute size. Further, microcomputer control can be employed in such an accelerometer, permitting the user to customize and calibrate the device for his specific application.

DESCRIPTION OF THE DRAWINGS

The benefits and advantages of the present invention will be better understood with reference to the following specification and drawings, wherein:

FIG. 3 is a plan view of the inertial mass and cross beam flexure suspension of the present invention;

FIG. 4 is a cross-sectional view taken along line 4—4 of FIG. 3;

FIG. 5 is a perspective view showing the cross beam flexure and cantilevered mounting of the inertial mass of the present invention in a slightly different configuration; and FIG. 6 is an electrical diagram of the integrated force balance accelerometer of the present invention.

DESCRIPTION OF THE PREFERRED EMBODIMENT

Figure 1:
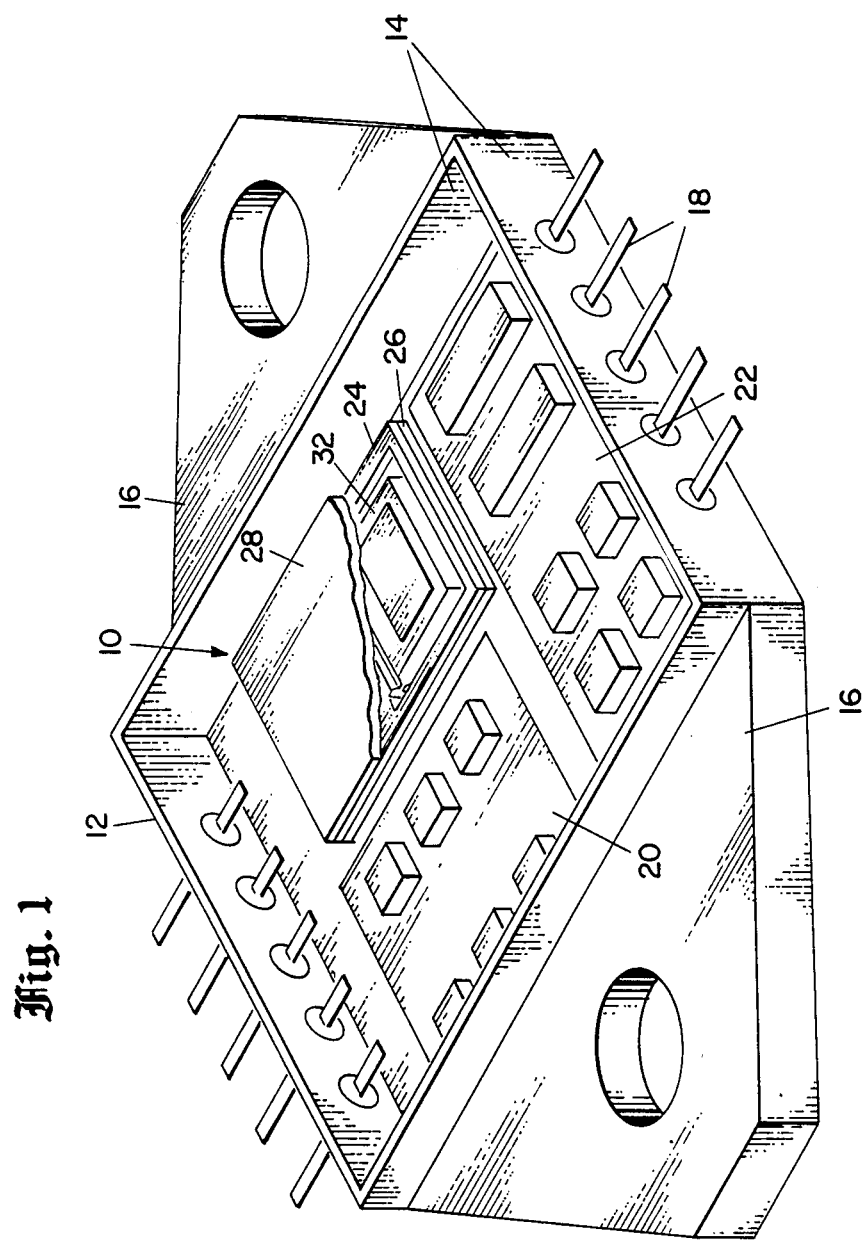
FIG. 1 is a broken perspective view showing an integrated force balanced accelerometer mounted within a typical housing for use within a system.

Referring now to the drawings, FIG. 1 shows, in broken perspective view, an integrated and force balanced accelerometer 10 mounted within a housing 12. Housing 12 includes four side walls with two mounting tabs 16 extending from two opposed side walls. Electrical contacts 18 are inserted within the two remaining opposed walls for providing electrical connection with the force balanced accelerometer 10. Separate hybrid circuits form an amplifier 20 and a compensation circuit 22 mounted within the housing 12.

Figure 2:
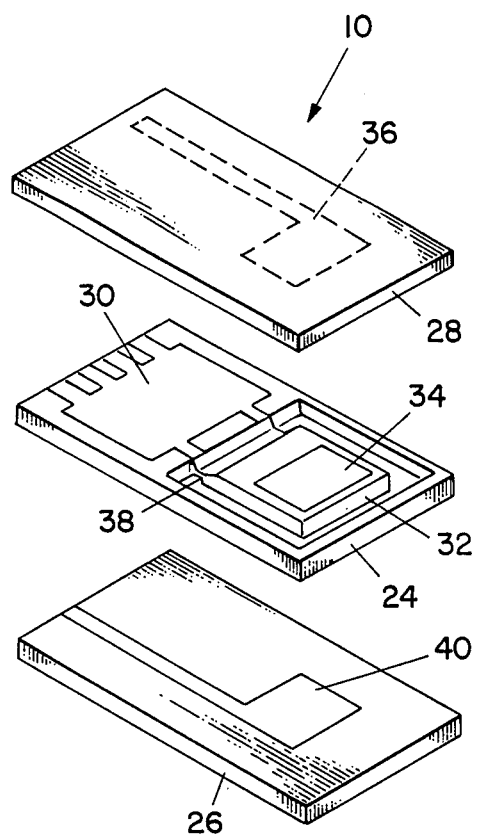
FIG. 2 is an exploded perspective view showing a single accelerometer chip fabricated from silicon and pyrex wafers.

As best seen in FIG. 2, the force balance accelerometer includes a semiconductor substrate 24 that may be fabricated from silicon sandwiched between a pair of non-conductive insulating layers 26 and 28 constructed from pyrex or other suitable dielectric material. The integrated force balanced accelerometer shown may be fabricated by know anisotropic etching techniques. Manufacture of the system is further simplified by its easy adaptations of known integrated circuit fabrication techniques that permit the formation of sensor, drive and data processing electronics, such as an accelerometer restoring amplifier (ARA) 30 onto the surface of the semiconductor substrate 24.

The accelerometer 10 includes an inertial mass 32 that senses accelerations normal to the plane of the substrate 24. The mass 32 includes a first conductive surface 34 that forms a capacitive pickoff in conjunction with a conductive surface 36 formed on the lower surface of the upper insulated substrate 28.

As seen in FIG. 2, the inertial mass 32 is cantilevered by a simple web-like hinge 38. This hinge 38 may be formed by the anisotropic etching of either side of the semiconductor substrate 24. A like technique may be employed to free the inertial mass 32 from the substrate 24. Alternate embodiments of the hinge 38 are disclosed in greater detail in conjunction with FIGS. 3-5 hereinbelow. The surface of the substrate 24 may be doped or metalized to form a conductive path between the amplifier 30 and the conductive surface 34. On the opposite surface of the inertial mass 32, a second conductive surface 34, seen in FIG. 4, is adjacent a conductive surface 40 on the lower, non-conductive substrate 26.

As will be readily understood, the application of an electrical potential by the ARA 30 to the conductive surface 34 between the conductive surfaces 36 and 40 on insulative layers 28 and 26, respectively, creates a bias field. This field serves to force the inertial mass 32 which includes the conductive surfaces 34 toward a "null" or neutral position. It will be appreciated that accelerations of a body fixed to the accelerometer 10 causes the inertial mass 32 to be displaced physically, unbalancing the capacitance bridge formed in part by plates 36 and 40 and conductive surfaces 34 and generating an electrical output signal to ARA 30. The above referenced system effects a closed loop feedback control mode of operation that maintains the range of motion of the inertial mass within an extremely confined physical space.

Referring now to FIGS. 3 and 4, a second type of hinge 39 is shown which, in the preferred embodiment, is constructed from crossed beam flexure blades 42. The blades 42 are formed by anisotropic etching of single crystal silicon. The silicon is oriented as a (1,0,0) silicon wafer and masked for etching which forms a V-shaped groove 44 in both upper and lower surfaces of the substrate 24. Referring to the hinge shown along line 4—4 of FIG. 3 in FIG. 4., it will be seen that the upper groove 44 is offset to the left from the lower groove 44. After the anisotropic etchant etches away the silicon, the thin blade 42 that remains between the grooves 44 is oriented at an angle having a positive slope to the plane of the semiconductive substrate 24. The second flexible blade 42' is formed by a similar set of the V-shaped grooves 44 which are oriented on opposite sides of substrate 24 in order to form a blade 42' that is arranged at approximately 70 degrees to the first blade 42 having its center aligned with the center of the first blade. Thus, the so called crossed beam flexure blades are formed. As seen FIG. 3, the flexure blades 42 and 42' comprise two pairs of crossed beam flexure blades 39. While etching the blades, the substrate 24 is masked to etch the periphery 46 of the inertial mass 32.

The inertial mass 32 and flexure blades 42 and 42' are doped with, for example, boron, to provide conductive surfaces. This doping may be continued across the surface of the substrate 24 to a contact pad 48, FIG. 3. The doped region etches at a rate significantly slower than the undoped regions. Therefore, the depth of the doped region can be used to control the crossed beam flexure blade thickness. These conductive surfaces may also be formed by metalizing techniques similar to the techniques used to place the conductive surfaces 36 and 40 on substrates 28 and 26, respectively. Using this technique, electrical connections are made between the conductive surfaces 36 and 40 and contact pads 50 and 52 on substrates 26 and 28, respectively.

In the preferred embodiment, it is desirable to remove excess silicon material from the semiconductor substrate that forms the inertial mass 32 to lighten that mass. One method of removing this material is to etch waffle-like dimples 54 in opposite surfaces of the substrate 24. A center hole 56 is also etched in mass 32 to balance the capacitance on surfaces 34 and to retain the center of gravity of the mass at its physical center. It will be understood that the mass of the inertial mass 32 should be kept small to present as large an area-to-mass ratio as possible.

An illustration of the inertial mass 32 supported by crossed beam flexure blade hinges 39 from the substrate 24 is shown in FIG. 5. It will be seen that appropriate etching of the V-shaped grooves 44 produces two pairs of crossed blades 42 and 42' whose centers coincide along a common line that lies in a plane containing the center of gravity and parallel to the plane of the substrate 24.

Note that the hinge arrangement shown in FIG. 5 is different from the orientation shown if FIG. 3 in that the center spacing is larger in FIG. 5. Obviously, other variations are possible within the teaching of this specification. The fabrication of the silicon structure can be performed by companies specializing in the fabrication of miniature, complexly shaped silicon structures. Among such companies are Transensory Devices, Inc., Fremont, Ca., and Dielectric Semiconductor, Santa Clara, Ca.

In FIG. 6, a typical circuitry that may be utilized with the force balanced accelerometer 10 is shown. This circuit is built atound an accelerometer restoring amplifier (ARA) 30 whose output is connected to an output terminal 61 and through a feedback loop to the contact pad 48 which, in turn, connects to the conductive surfaces 34 of inertial mass 32 disposed between the upper conductive electrode 36 and lower electrode 40. The electrodes 36 and 40 are connected by blocking capacitors 64 and 66 to the input terminals of amplifier 30. The contact pad 52 is connected to a junction 68 and then to the electrode 36. Similarly, the contact pad 50 on the lower substrate 26 connects via a junction 70 to the electrode 40. Connected between junctions 68 and 70 are a pair of capacitors 72 and 74 whose common electrode is connected to a source of alternating power 76 such as a source of 50 kilohertz forming the capacitance pickoff bridge. Terminals 50 and 52 are retained at minus 15 volts D.C. and plus 15 volts D.C. respectively.

In operation, the upward displacement of the inertial mass 32 causes the A.C. voltage to decrease across electrode 36 and increase across electrode 40. This A.C. voltage change is applied to the input of amplifier 30 which generates a feedback signal that is applied to terminal 48 for application to inertial mass 32 to return the accelerometer to a balanced or "null" condition. The output signal from amplifier 30 also appears as the accelerometer information output signal for appropriate system use at terminal 61.

While the preferred embodiment has been described to include a web-like hinge 38 or a crossed beam flexure blade hinge 39, it will be understood that other embodiments of the preferred invention are possible. Accordingly, the present invention should be limited only by the appended claims.

I claim:

1. An integrated, force balanced accelerometer, comprising:

capacitance forming means having substantially parallel electrodes;

acceleration sensitive means flexibly mounted between said parallel electrodes in a neutral position;

said acceleration sensitive means formed within a substrate of semiconductor material by forming an opening therein that defines the periphery of said acceleration sensitive means in said substrate to define an inertial mass attached to said substrate by hinge means;

said hinge means, include crossed beam flexure blades formed within said semiconductor substrate;

means for applying a D.C. electrical potential across said parallel electrodes of said capacitance forming means to establish a bias field;

a means for generating A.C. electrical potentials between said acceleration sensitive means and said parallel electrodes, which potential change as said acceleration sensitive means undergoes a displacement from said neutral position; and electronic means connected between said parallel electrodes of said capacitance forming means and said acceleration sensitive means to close an electrical servo loop therebetween, wherein motion of said acceleration sensitive means causes an output from said electronic means to return said acceleration sensitive means to said neutral position and represent the acceleration of said accelerometer.

2. An integrated, force balanced accelerometer, as claimed in claim 1, additionally comprising:

said acceleration sensitive means formed within said substrate of semiconductor material by doping said material to become conductive;

said capacitance forming means formed by a pair of insulated plates mounted on opposite sides of said semiconductor material and having electrically conductive pads disposed thereon adjacent said acceleration sensitive means.

3. An integrated, force balanced accelerometer, as claimed in claim 1, wherein:

said hinge means include a pair of hinges each having a pair of flexure blades attached to one end of said inertial sensitive mass to support said mass as a cantilevered mass.

4. An integrated, force balanced accelerometer, as claimed in claim 1 wherein:

said crossed beams flexure blades are formed by anisotropic etching of a single crystal that forms said semiconductor substrate.

5. An integrated, force balanced accelerometer, as claimed in claim 1, wherein:

said cross beam flexure blades include at least a pair of blades formed by off-set, V-shaped grooves within opposite surfaces of said semiconductor substrate, each blade arranged at an incline to the plane of said substrate, and at an opposite incline to the angle of the other blade of said pair to form said crossed beam flexure blades.

6. An accelerometer comprising:

a first planar substrate of semiconductor material having an opening therein that defines the periphery of an acceleration sensitive mass;

said acceleration sensitive mass connected to said semiconductor substrate by a plurality of crossed beam flexure blades formed within said substrate;

second and third planar substrates mounted on opposite sides of said first planar substrate each having a conductive surface adjacent said acceleration sensitive mass;

means for applying an electrical potential between said acceleration sensitive mass and said conductive surfaces on said second and third substrates.

7. An accelerometer, as claimed in claim 6, additionally comprising:

means formed within said semiconductor material for controlling the output signal of said accelerometer.

8. An accelerometer, as claimed in claim 6, wherein: said crossed beam flexure blades provide for a cantilevered flexure in one direction and rigidity in all other directions.

9. An accelerometer, as claimed in claim 6, wherein: said crossed beam flexure blades are formed in pairs, each blade formed by two V-shaped grooves in opposite surfaces of said semiconductor substrate which form a blade at an angle to the plane of said substrate, each blade of said pair being at an opposite angle to the other.

10. An accelerometer, as claimed in claim 6, wherein: said acceleration sensitive mass has a waffle-like pattern to create a large surface area-to-mass ratio.

11. An accelerometer, as claimed in claim 6, wherein: said second and third substrates are formed of nonconductive material.

12. In an accelerometer having a planar inertial mass formed in a plane of semiconductor material and at least one capacitance forming electrode parallel thereto, wherein the improvement comprises:

said inertial mass formed by an opening within said semiconductor plane that defines the periphery of said inertial mass; and hinge means joining said semiconductor plane to said inertial mass including a plurality of crossed beam flexure blades formed in said semiconductor material.

13. In an accelerometer, as claimed in claim 12, additionally comprising:

said crossed beam flexure blades formed in pairs, each blade formed by two V-shaped grooves in opposite surfaces of said semiconductor plane which form a blade at an angle to said plane, each blade of said pair formed at an opposite angle from said other blade.

* * * * *